United States Patent
Lemke et al.

(10) Patent No.: US 9,778,133 B2
(45) Date of Patent: Oct. 3, 2017

(54) DEVICE AND METHOD FOR CHECKING AN ASSEMBLY WRENCH

(71) Applicant: Robert Bosch GmbH, Stuttgart (DE)

(72) Inventors: Gerhard Lemke, Esslingen (DE);
Reinhard Hoss, Plochingen (DE);
Howard Reyer, Ebersbach (DE);
Norbert Niehage, Lenningen (DE);
Christian Belke, Hallstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/347,948

(22) PCT Filed: Sep. 24, 2012

(86) PCT No.: PCT/EP2012/068747
§ 371 (c)(1),
(2) Date: Mar. 27, 2014

(87) PCT Pub. No.: WO2013/050266
PCT Pub. Date: Apr. 11, 2013

(65) Prior Publication Data
US 2014/0352398 A1    Dec. 4, 2014

(30) Foreign Application Priority Data
Oct. 5, 2011   (DE) .................. 10 2011 084 008

(51) Int. Cl.
*G01L 25/00*   (2006.01)
*G01L 5/24*    (2006.01)

(52) U.S. Cl.
CPC .............. *G01L 25/003* (2013.01); *G01L 5/24* (2013.01)

(58) Field of Classification Search
CPC ...... G01L 25/003; G01L 25/00; B25B 23/144
USPC .......................... 73/1.09, 1.75, 1.12; 91/362
See application file for complete search history.

(56) References Cited

U.S. PATENT DOCUMENTS

| | | | | |
|---|---|---|---|---|
| 3,425,270 | A * | 2/1969 | Hainz | 73/114.41 |
| 4,951,549 | A * | 8/1990 | Olsen et al. | 91/363 R |
| 6,167,788 | B1 * | 1/2001 | Schonberger et al. | 81/467 |
| 6,609,407 | B1 | 8/2003 | Tambini | |
| 7,565,844 | B2 * | 7/2009 | Crass et al. | 73/862.21 |
| 2007/0035268 | A1 * | 2/2007 | Goto et al. | 318/685 |
| 2007/0075674 | A1 * | 4/2007 | Tsubota | 318/811 |
| 2008/0110690 | A1 * | 5/2008 | Lee et al. | 180/447 |
| 2009/0222222 | A1 * | 9/2009 | Lucke | 702/41 |

(Continued)

FOREIGN PATENT DOCUMENTS

CN         1609442 A  *  4/2005  ............. F01M 65/00

*Primary Examiner* — Laura Martin
*Assistant Examiner* — Jean Morello
(74) *Attorney, Agent, or Firm* — Norton Rose Fulbright US LLP; Gerard Messina

(57) ABSTRACT

A method for checking an assembly wrench, having an integrated angular measuring device, includes: fixing the assembly wrench in a rotatable fixing device; activating the angular measuring device integrated in the assembly wrench; rotating the fixing device by at least one specified angle; reading off the angle of rotation measured by the angular measuring device integrated in assembly wrench; and comparing the angle of rotation measured by the angular measuring device integrated in the assembly wrench to the specified angle, by which the fixing device has been rotated.

8 Claims, 1 Drawing Sheet

(56) References Cited

U.S. PATENT DOCUMENTS

2010/0058901 A1* 3/2010 Calloway et al. ............. 81/479
2010/0218588 A1* 9/2010 Staniewicz et al. ........... 73/1.75
2010/0270721 A1 10/2010 Liu

* cited by examiner

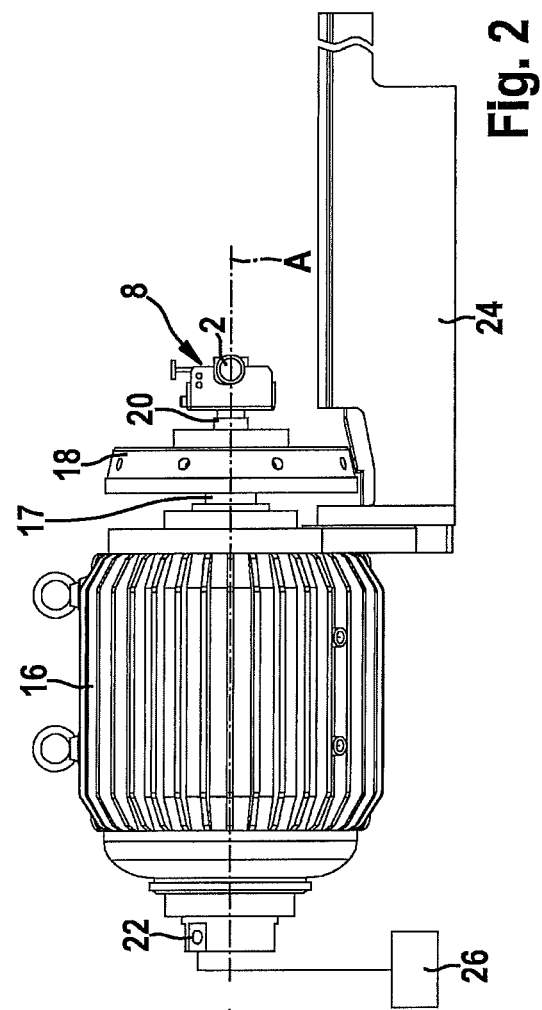
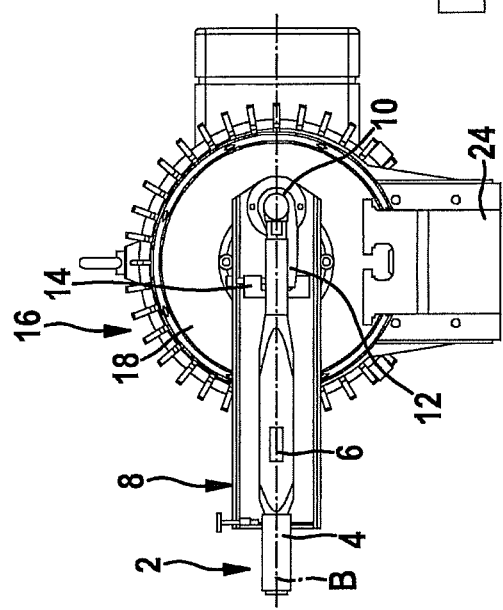

DEVICE AND METHOD FOR CHECKING AN ASSEMBLY WRENCH

FIELD OF THE INVENTION

The present invention relates to a testing device and a testing method for checking an assembly wrench, in particular for checking an angular measuring device that is integrated into the assembly wrench.

BACKGROUND INFORMATION

Assembly wrenches are increasingly being used for tightening screw connections using a specified torque, which besides, or instead of a conventional display of the torque exerted upon the screw joint, have an integrated angular measuring device and an angular measuring display, in order to measure and display the angle by which the assembly wrench has been rotated.

When using such assembly wrenches, it is possible, by pretightening the screw connection using a light torque, and subsequently rotating the assembly wrench by a specified angle of rotation, to produce screw connections in which the prestressing force of the screw connection moves within a lesser tolerance range than when tightening using a conventional torque wrench, which displays the starting torque applied or, upon exceeding a specified starting torque, "slips".

In order to ensure a constant quality of the screw connections thus produced, regular checking is required and possibly the calibration of the angular measuring device that is integrated in the assembly wrench.

It is believed that the methods up to now, for checking and calibrating such assembly wrenches either require too much. effort, are tedious and costly, such as sending them in to the manufacturer, or do not have the requisite accuracy, such as checking the angle display with so-called angle disks.

SUMMARY OF THE INVENTION

It is an object of the present invention to provide a method and a device that make it possible to check assembly wrenches having an integrated angular measuring device rapidly, cost-effectively and with great accuracy.

In one test method, according to the present invention, for checking an angular measuring device integrated in an assembly wrench, the assembly wrench is first fixed in a rotatable fixing device. The angular measuring device integrated in the assembly wrench is activated, if necessary by prestressing the assembly wrench, for example. After the activation of the angular measuring device, the fixing device, and thus also the fixed assembly wrench is rotated by at least an angle that was determined before and/or is able to be read off with high accuracy.

The angle of rotation measured by the angular measuring device integrated in the assembly wrench is read off. By comparing the angle of rotation, that has been read off at the angular measuring device of the assembly wrench, with the known, specified angle by which the fixing device having the assembly wrench has been rotated, the angular measuring device integrated in the assembly wrench is able to be checked; in particular, the difference of the two angles may be ascertained and compared to a specified tolerance value.

If the difference of the two angles that were read off is less than the specified tolerance value, the angular measuring device integrated in the assembly wrench is in order, and the assembly wrench may further be used. If the difference between the angle displayed by the angle display in the assembly wrench and the specified angle by which the fixing device together with the assembly wrench has been rotated, exceeds the specified tolerance value, additional measures, such as a recalibration and/or sending in the assembly wrench to the manufacturer may be required, in order to reproduce the desired accuracy again, before the assembly wrench is able to be used again.

A testing device, according to the present invention, for checking an assembly wrench having an integrated angular measuring device, has a fixing device which is developed for fixing, especially clamping in, an assembly wrench that is to be checked. The fixing device is able to be rotated by a specified angle, the angle by which the fixing device has been rotated being determined with a specified accuracy and/or being able to be read off on the testing device.

A testing device according to the present invention and a testing method enable rapid checking of assembly wrenches having an integrated angular measuring device without a long downtime, at slight expenditure and low cost. A testing device according to the present invention for checking assembly wrenches is able to be implemented and used cost-effectively.

In particular, as the testing device for checking assembly wrenches having an integrated angular measuring device, a conventional injection pump test stand may be used, since such an injection pump test stand has many of the features required for checking assembly wrenches having an integrated angular measuring device. By using an injection pump test stand that is frequently already present in the repair shop field, the costs that arise during the checking, according to the present invention, of assembly wrenches having an integrated angular measuring device, may be kept particularly low.

Every assembly wrench has a contact area, which during normal use comes into contact with the screw that is to be tightened, and has an effect on the screw connection that is to be tightened. In one specific embodiment, the angular measuring device integrated in the assembly wrench is activated by rotating the contact area of the assembly wrench. This enables a simple and reliable activation of the integrated angular measuring device, as usually also takes place during the normal application of the assembly wrench. Alternatively, the angular measuring device may be activated by operating a switch, for example.

In one specific embodiment, an angle-of-rotation sensor is provided in order to measure the angle by which the fixing device, and with that, also the assembly wrench fixed in the fixing device are rotated. The value by which the assembly wrench has been rotated may thus be reliably determined at the desired accuracy.

In one specific embodiment, the angle-of-rotation sensor is developed in such a way that it is able to measure the angle, by which the fixing device is rotated, with great accuracy, particularly with a precision of at least 0.1 degrees. Because of that, one is able to check the angle display of the assembly wrench with great accuracy. A precision of at least 0.1 degrees is particularly greater than the precision of the angle measurement that is usually required when using the assembly wrench.

In another specific embodiment, the rotation of the fixing device and of the assembly wrench fixed in it takes place at a constant angular velocity. Inertial effects, that are able to occur by accelerating or braking the rotational motion of the assembly wrench, are thereby reliably avoided and the accuracy of the testing method is raised.

In one specific embodiment, a motor is provided which is developed to rotate the fixing device. A motor which may be configured as an electric motor enables a convenient, and particularly a uniform rotation of the fixing device by a specified angle, without possibly fluctuating effects by the operator, as may occur in response to a manual rotation. The measurements are therefore particularly reliable and reproducible at great accuracy.

In still another specific embodiment, the motor is developed as an electrical stepper motor. A stepper motor makes it possible to rotate the fixing device, by a suitable actuation at high accuracy, by a specified angle, so that no additional angle-of-rotation sensor is required to measure the angle by which the fixing device and the assembly wrench fixed in it have been rotated. A testing device equipped with a stepper motor therefore makes it possible reliably, and with great accuracy, to check the angular measuring device integrated in the assembly wrench. The costs for the angle-of-rotation sensor may be saved and the angle-of-rotation sensor drops out as a possible source of error.

In still another specific embodiment, the stepper motor is developed so that it is in a position to rotate the fixing device in constant steps of not more than 0.1 degrees per step. The fixing device and an assembly wrench fixed in the fixing device are thus able to be rotated at high accuracy, particularly a precision of at least 0.1 degrees, so that the angular measuring device integrated in the assembly wrench is able to be checked with great accuracy.

The present invention is explained in greater detail below with reference to the appended figures.

BRIEF DESCRIPTION OF THE DRAWINGS

FIG. 1 shows a front view of an exemplary embodiment of a testing device according to the present invention, having an assembly wrench that is to be checked.

FIG. 2 shows a side view of the testing device shown in FIG. 1, with the assembly wrench to be checked.

DETAILED DESCRIPTION

A testing device according to the present invention has an electric motor 16 which is rigidly mounted on a mounting rail 24, which is mounted, for instance, on a repair shop table.

Motor 16 has a shaft 17, which extends in the horizontal direction in the exemplary embodiment shown in the figures, and which is driven in the operation of motor 16 and is rotated about its longitudinal axis A. A flywheel 18 is mounted, rotationally symmetrically about longitudinal axis A, on shaft 17.

On the side of flywheel 18 facing away from motor 16, via a clutch 20 which may particularly be developed as a slip clutch, a fixing device 8 is mounted, which is developed to accommodate an assembly wrench 2 that is to be checked, having an integrated angular measuring device.

Fixing device 8 particularly has an accommodation 10, which is developed for accommodating a contact area of assembly wrench 2, which during normal use of assembly wrench 2 acts on the screw connection that is to be tightened. Using an operating lever 12, which is able to be moved and fixed by a locking device 14, the contact area of assembly wrench 2 may be fixed, and particularly clamped in, in accommodation 10.

Assembly wrench 2 has an handle region 4, developed rod-shaped, whose longitudinal axis B is developed at right angles to the axis of the contact area. Longitudinal axis B of grip region 4 of assembly wrench 2 is situated at right angles to axis A of shaft 17 of motor 16, when assembly wrench 2 is properly clamped into fixing device 8, as shown in FIG. 1.

During or after the clamping in of the contact area of assembly wrench 2 into fixing device 8, the contact area of assembly wrench 2 is slightly rotated with respect to handle region 4 by operating lever 12, so that the angular measuring device integrated in assembly wrench 2 is activated, which is developed as an electrically operated gyrometer, for example. The angular measuring device may also be activated differently, if necessary, such as by operating a switch. What is important is that the integrated angular measuring device is active during the following rotation.

After assembly wrench 2 has been fixed in fixing device 8 and the angular measuring device integrated in assembly wrench 2 has been activated, motor 16 is actuated in such a way that it rotates shaft 17, and with that, fixing device 8 and assembly wrench 2 fixed in fixing device 8 by a specified angle about longitudinal axis A of shaft 17 of motor 16.

The activated angular measuring device integrated in assembly wrench 2 measures the angle by which handle region 4 of assembly wrench 2 is being rotated. The angle measured by the integrated angular measuring device is displayed on a display device 6, which is developed, for instance, in the form of a digital display in handle region 4 of assembly wrench 2.

At the same time, the angle, by which shaft 17 of motor 16 is rotated, is measured by an angle-of-rotation sensor 22 that is mounted on the opposite side of motor 16 facing away from fixing device 8, and the result of the measurement is displayed on an external display device 26.

The angular measuring device integrated in assembly wrench 2 is able to be checked by comparing the angle displayed by display device 6, that is integrated in assembly wrench 2, with the angle displayed by external display device 26. In particular, the difference in the angles displayed by the two display devices 6, 26 is able to be compared to a specified tolerance value. If the difference between the two displayed values is greater than the specified tolerance value, a recalibration is required of angular measuring device integrated in assembly wrench 2.

As motor 16, one may use, for example, motor 16 of an injection pump test stand, that is frequently already present in the repair shop field, which has been equipped with an additional fixing device 8. The checking of the angular measuring device integrated in assembly wrench 2 is thus able to be implemented cost-effectively, since only the costs for fixing device 8 arise, and the costs for an additional motor 16 are able to be saved.

Alternatively, the testing device for checking the angular measuring device integrated in an assembly wrench 2 may be implemented as a compact stand-alone unit, which is specialized and optimized for checking assembly wrench 2 having the integrated angular measuring device.

As motor 16, one may particularly use a stepper motor. The use of a stepper motor makes it possible to rotate fixing device 8 reliably and with high accuracy by a defined, specified angle about axis A of shaft 17. If motor 16 is configured as a stepper motor, one may do without an angle-of-rotation sensor 22 mounted on motor 16 and an associated external display device 26, since the angle, by which fixing device 8 and thus assembly wrench 2 are rotated, is specified by the number of steps carried out by the stepper motor, which is equal to the number of the electrical pulses applied to the stepper motor and the constant angle of rotation that is conditioned upon its configuration, which shaft 17 of stepper motor 16 carries out at each step/pulse.

In one additional specific embodiment not shown in the figures, display 6 of the angular measuring device integrated in assembly wrench 2 is automatically read out, e.g. by a camera, and compared to the specified angle by which motor 16 has rotated fixing device 8 and assembly wrench 2 that is fixed in it. Checking the angular measuring device integrated in assembly wrench 2 may thus be automated, and human errors, which may occur in response to reading off display devices 6, 26 and/or comparing the measured values read off display devices 6, 26, are reliably avoided.

Alternatively or in addition, assembly wrench 2 may be developed to have an electronic data interface, for instance, having a USB or Bluetooth interface, in order to enable direct electronic transmission of the angle measured by the angular measuring device integrated in assembly wrench 2 to an external evaluation device.

In order to increase the accuracy and the reliability of the checking of the angular measuring device integrated in assembly wrench 2, a number of different measuring points (angles) may be brought up during a measuring process and a checking process. For each of the measuring points, the deviation of the angle that has been ascertained by the angular measuring device integrated in assembly wrench 2 is determined by the defined, specified angle by which shaft 17 of motor 16 has been rotated. In a second step, the average value and/or the maximum value of the deviations thus determined are ascertained and compared to a specified tolerance value, in order to determine the quality of the angular measuring device integrated in assembly wrench 2.

A testing device according to the present invention and a testing method according to the present invention make it possible to check reliably an angular measuring device, integrated in an assembly wrench 2, with great accuracy and at low costs. Sending back assembly wrench 2 to its manufacturer is required only in exceptional cases, in which a deviation of the measured values is determined, which cannot be corrected locally.

The maintenance costs for assembly wrenches 2 having an integrated angular measuring device may be permanently reduced without this resulting in the loss in quality of the screw connections produced using assembly wrenches 2.

What is claimed is:

1. A method for checking an assembly wrench having an integrated angular measuring device, the method comprising:

fixing the assembly wrench in a rotatable fixing device;

activating the angular measuring device integrated in the assembly wrench;

rotating the fixing device by at least one specified angle and measuring, by an angle-of-rotation sensor, the angle by which the fixing device has been rotated;

and comparing an angle of rotation measured by the angular measuring device integrated in the assembly wrench to the angle measured by the angle-of-rotation sensor, wherein a motor is at least partially disposed between the angle-of-rotation sensor and the angular measuring device.

2. The method of claim 1, wherein the rotation of the fixing device takes place at a constant angular velocity.

3. The method of claim 1, wherein the activation of the angular measuring device integrated in the assembly wrench takes place by rotating a contact area of the assembly wrench.

4. A testing device for checking an assembly wrench, into which an angular measuring device is integrated, comprising:

a fixing device to fix an assembly wrench that is to be checked, wherein the fixing device is rotatable by an angle that is able to be at least one of specified or read off on the testing device;

a motor to rotate the fixing device; and an angle-of-rotation sensor to measure the angle by which the fixing device has been rotated, wherein a motor is at least partially disposed between the angle-of-rotation sensor and the angular measuring device.

5. The testing device of claim 4, wherein the angle-of-rotation sensor is configured to measure the angle by which the fixing device has been rotated, with great accuracy, so that it is with a precision of at least 0.1 degrees.

6. The testing device of claim 4, wherein the motor is a stepper motor.

7. The testing device of claim 6, wherein the stepper motor is configured to rotate the fixing device in steps of not more than 0.1 degree.

8. The testing device of claim 4, wherein the motor is a part of an injection pump test stand.

* * * * *